United States Patent [19] [11] 4,323,484
Hattori et al. [45] Apr. 6, 1982

[54] GLAZE RESISTOR COMPOSITION

[75] Inventors: Masumi Hattori; Toru Ishida, both of Hirakata; Shinichi Tanaka, Kyoto, all of Japan

[73] Assignee: Matsushita Electric Industrial Co., Ltd., Osaka, Japan

[21] Appl. No.: 97,044

[22] Filed: Nov. 23, 1979

[30] Foreign Application Priority Data

Nov. 25, 1978 [JP] Japan .................. 53-145482

[51] Int. Cl.³ .............................................. H01B 1/06
[52] U.S. Cl. .................................. 252/521; 252/518; 252/512; 501/19; 501/21; 501/77; 501/153; 501/154
[58] Field of Search ............... 252/521, 519, 512, 518; 106/47 R, 54, 73.4, 48, 73.5

[56] References Cited

U.S. PATENT DOCUMENTS

| | | | |
|---|---|---|---|
| 3,027,332 | 3/1962 | Media | 252/520 |
| 3,119,717 | 1/1964 | Veres | 252/521 |
| 4,119,573 | 10/1978 | Ishida et al. | 252/519 |
| 4,183,830 | 1/1980 | Chester | 252/521 |

Primary Examiner—Benjamin R. Padgett
Assistant Examiner—J. L. Barr
Attorney, Agent, or Firm—Wenderoth, Lind & Ponack

[57] ABSTRACT

A glaze resistor composition composed of a glass frit, molybdenum disilicide, tantalum disilicide, magnesium silicide and aluminum. This glaze resistor composition has a small temperature coefficient of resistivity, a high resistivity stability and small current noises, and can be used in a wide resistivity range.

6 Claims, 3 Drawing Figures

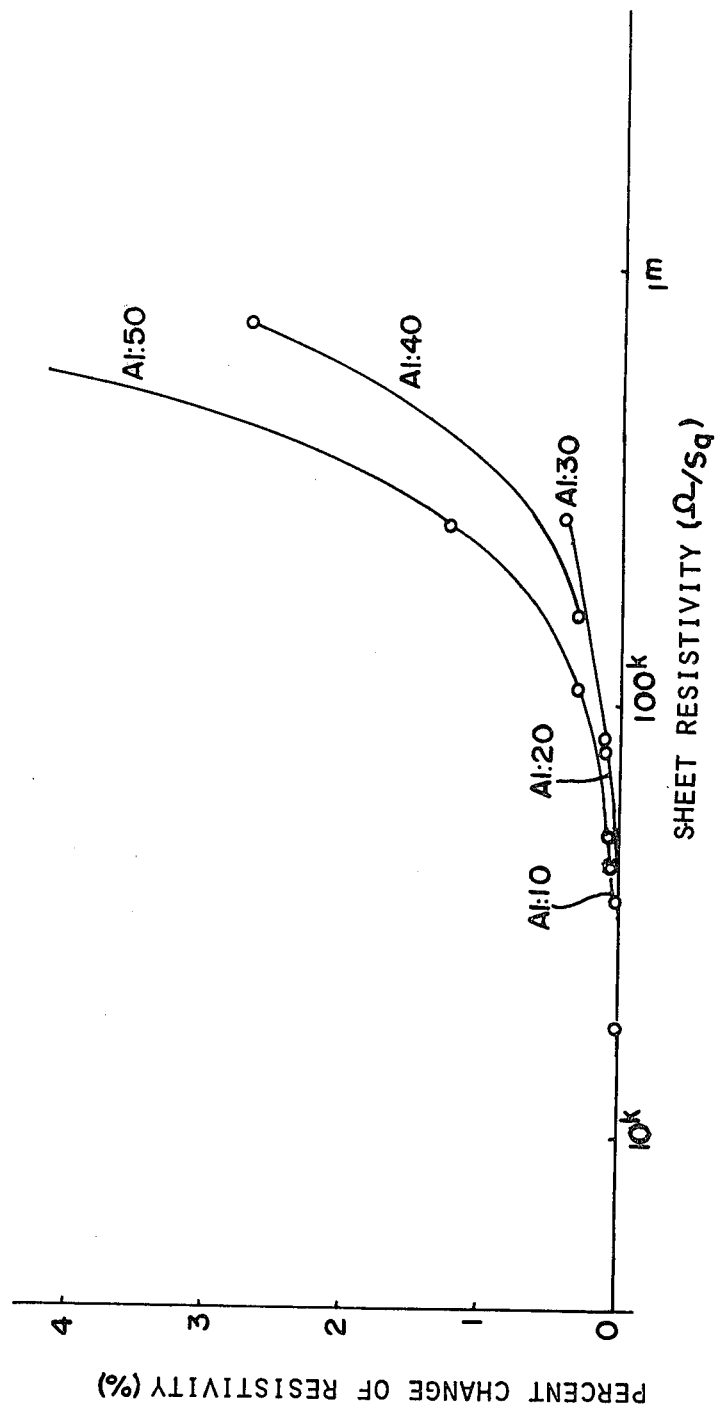

GLAZE RESISTOR COMPOSITION

This invention relates to a glaze resistor composition. Glaze resistor compositions for coating suitable heatresistant substrates and firing in air to form glaze resistors are well known, for example, $RuO_2$, Ag, and Ag-Pd glaze etc. Particularly, $RuO_2$ glaze resistor is often used commercially, because it has good resistor characteristics.

Glaze resistors containing a mixture of several silicides are also known, for example, molybdenum disilicide, molybdenum boride and tungsten disilicide (as disclosed in British Pat. No. 1,263,728), or molybdenum disilicide, tantalum disilicide and a glass frit containing alumina (as disclosed in U.S. Pat. No. 3,027,332).

However, such compositions have a temperature coefficient of resistivity which is too high for many purposes, a relatively unstable resistivity, too large a current noise a limited resistivity range.

It is an object of this invention to provide a glaze resistor composition having a satisfactory temperature coefficient of resistivity, a high resistivity stability, small current noises and usable in a wide resistivity range.

This object is achieved according to this invention by providing a glaze resistor composition which consists essentially of 95 to 50% by weight of a glass frit and 5 to 50% by weight of a mixture of silicides comprising molybdenum disilicide, tantalum disilicide, magnesium silicide and aluminium, the molar ratio of molybdenum disilicide plus tantalum disilicide plus magnesium silicide to aluminium being from 90:10 to 60:40.

This invention will be described in detail hereinafter.

According to a first aspect of the present invention, there is provided a glaze resistor composition which consists essentially of 95 to 50% by weight of a glass frit and 5 to 50% by weight of a mixture of silicides and aluminium. The silicides are magnesium silicide, molybdenum disilicide and tantalum disilicide. The molar ratio of molybdenum disilicide plus tantalum disilicide to magnesium silicide is from 30:70 to 90:10, and molybdenum disilicide plus tantalum disilicide plus magnesium silicide to aluminium being from 90:10 to 60:40% by molar.

The addition of aluminium to a mixture of molybdenum disilicide, tantalum disilicide and magnesium silicide in the composition according to the invention stabilizes the resistivity of the resulting resistor over a wide range of resistivity and improves the temperature coefficient of resistivity, stability under load and current noises. These properties are believed to result from aluminium acting as a conductor and providing intimate connection between a conductor and glass by oxidation during the composition.

If aluminium is used in a too large amount, the resistivity of the resistor increases, but current noises also increase. If magnesium silicide is used in a too large amount, the stability of the resulting resistor is lowered, because magnesium silicide would be converted to magnesium hydroxide by hydrolysis. If tantalum disilicide is used in a too small amount, the homogeneity of the resistor film may be impaired by the presence of bubbles therein. If molybdenum disilicide is used in a too small amount, a load test stability is impaired.

It is preferred that the mixture of silicide and aluminium in the composition according to the invention contains the silicides in amounts such that the molar ratio of molybdenum disilicide plus tantalum disilicide to magnesium silicide is from 60:40 to 80:20 and the molar ratio of molybdenum disilicide plus tantalum disilicide plus magnesium silicide to aluminium is from 85:15 to 65:35.

In one embodiment of the present invention, the resistivity of the resulting resistor increases by the inclusion of aluminium in the mixture of silicides, preferably in an amount of from 10 to 40 molar ratio. Too much aluminium is undesirable because of current noises and load test characteristics which would result therefrom. Also, too much magnesium silicide is undesirable because of the current noises and humidity characteristics which would result therefrom.

The conductor consisting of a mixture of silicides and aluminium according to the invention is made as described below. A suitable amount of molybdenum, tantalum, magnesium, silicon and aluminium are mixed by a mixing machine, and pressed to a tablet of a suitable size. The tablets are fired at a temperature of 800° to 1300° C. in an inert gas such as argon or in an active gas such as hydrogen. Each fired tablet is crushed roughly using a crushing machine, and ground into fine granules, having an average particle size of 0.1 micron, by a ball mill. Any suitable glass frit may be included in the composition according to the invention, but a preferred glass frit is a barium borate series glass, especially containing niobium oxide $Nb_2O_5$. A preferred barium borate series glass has the following composition, by weight:

| | |
|---|---|
| BaO | 25 to 55 |
| $B_2O_3$ | 30 to 60% |
| $SiO_2$ | 0 to 10% |
| $Al_2O_3$ | 0 to 16% |
| CaO | 0 to 5% |
| MgO | 0 to 5% |
| $Nb_2O_5$ | 0 to 3% |

The glass frit is necessary for obtaining superior resistance to humidity and heat, suitable reaction with conductive powder in the firing of the resistor, and to distribute the conduction powder evenly therein. The $SiO_2$, $Al_2O_3$, MgO and CaO components in the glass frit improve resistance to humidity and heat. $Nb_2O_5$ improves the distribution of the conduction powder in the glass together with magnesium silicide and aluminium in the conduction powder. As a result, the resistor has a higher resistivity value and good stability characteristics.

Materials used for making the glass frits are described below.

A material for BaO is $BaCO_3$, which by firing, is reduced to BaO (and $CO_2$). A material for $B_2O_3$ is $H_3BO_3$, which by firing is reduced to $B_2O_3$ (and $H_2O$). A material for $Al_2O_3$ is $Al_2O_3$ or aluminium hydroxide $Al_2(OH)_3$, which by firing is reduced to $Al_2O_3$ (and $H_2O$). A material for CaO is $CaCO_3$, which by firing is reduced to CaO (and $CO_2$). $SiO_2$, MgO and $Nb_2O_5$ used are oxide metals. The glass frits are made e.g. in a manner as follows. The respective materials of the glass are mixed in a ratio e.g. as follows: $BaCO_3:H_3BO_3:SiO_2:Al_2O_3:CaCO_3:MgO:Nb_2O_5 = 34.2:51.3:3.4:6.0:2.15:2.70:0.25$ in weight %. The mixed powders are melted at 1200° C. for 30 minutes in air in an alumina crucible. In heating, the molten material is converted to glass, and the generated $CO_2$ and $H_2O$ evaporates off. Next, the molten glass is cooled and roughly crushed with water. Further, the roughly crushed glass particles are ground through a screen mesh of 400 mesh. And finally this ground glass particles are ground by a ball mill into fine granules, having an average particle size of 3 microns.

A typical method of making a glaze resistor using a glaze resistor composition according to the invention will now be described. A glaze resistor composition including an appropriate amount of glass frit and a suitable organic liquid vehicle (such as terpineol having 10% ethylcellulose dissolved therein) are mixed to a paste. The paste is applied to a refractory substrate such as a ceramic plate, and is then heated or fired in air in, for example, a tunnel furnace, at a temperature such that the glass frit is adequately fused thereto and to form a stable glaze resistor film on the refractory substrate.

A typical heating temperature is from 750° to 1000° C., more preferably from 800° to 900° C., for time of from 3 to 30 minutes. During the heat treatment, the liquid vehicle evaporates off or burns off, and does not substantially affect the resistivity or other characteristics of the resultant glaze resistor.

A typical method of making a glaze resistor using a glaze resistor composition according to the invention will be described below. In order that the invention may be more fully understood, the following Examples are given by way of illustration only. In the Examples, reference will be made to the accompanying drawings, in which:

FIG. 3 is a graph showing the relation between the resistivities and the change of resistivities of two types of glaze resistors after a load test.

EXAMPLE 1

Figure 1:
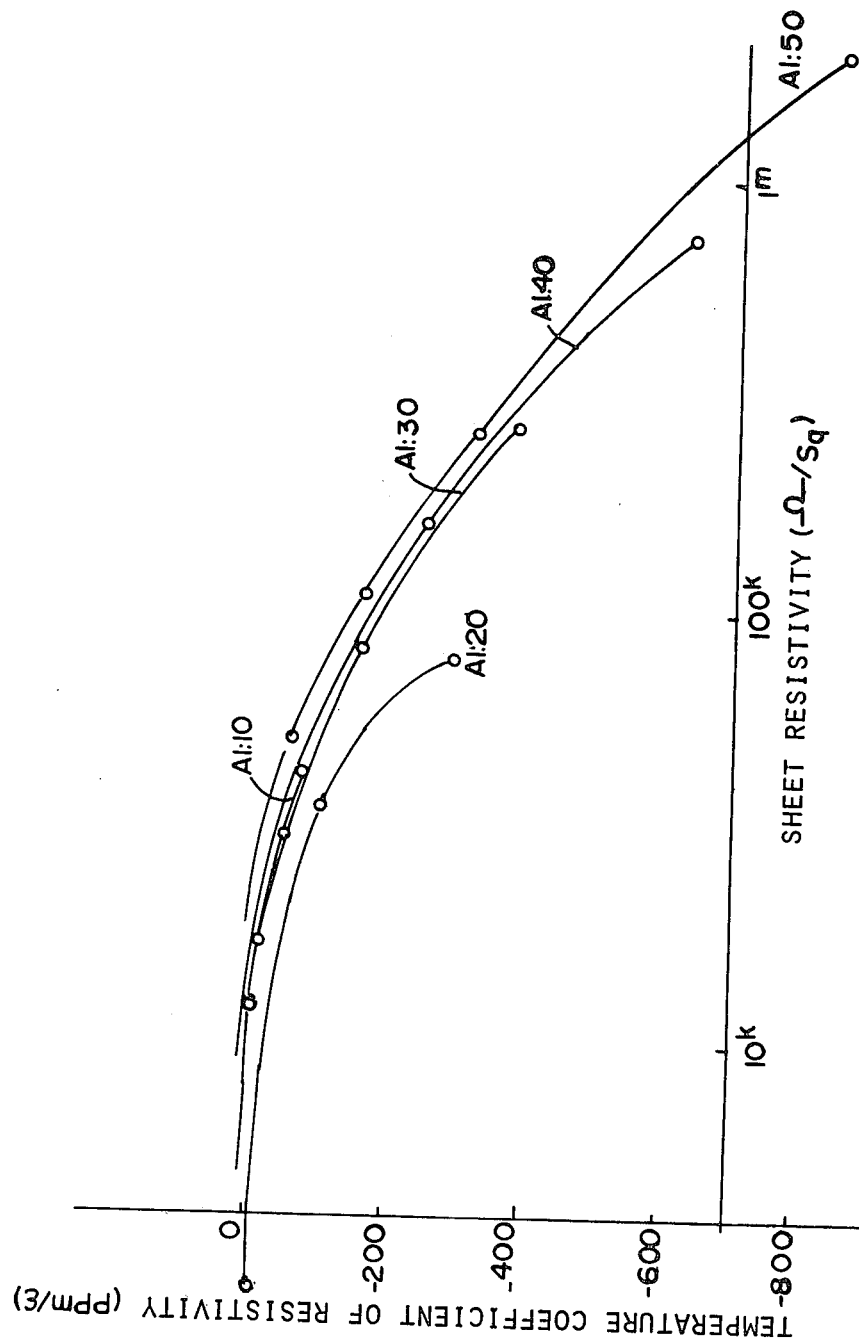
FIG. 1 is a graph showing the relation between the resistivities and temperature coefficients of resistivity of two types of glaze resistors.

Sixty different glaze resistor compositions without aluminium, for comparison, were prepared, having a composition shown in Table 1. Each composition was made as follows:

Mixtures of silicides in the form of a powder having an average particle size of 0.2 micron and glass frit were made up in the percentage shown in Table 1. The glass frit used had an average particle size of 3 microns, and composed of a barium borate glass frit. Each mixture of silicides and the glass frit was well dispersed in an appropriate amount of liquid vehicle to make a paste suitable for screen printing. Each paste was applied on a ceramic substrate by screen printing and dried, followed by heating in air at a temperature of 850° C. for 10 minutes to obtain sixty glaze resistors each in the form of a film.

The sheet resistivity R ($\Omega$/sq), temperature coefficient of resistivity TCR (ppm/°C.), current noise (dB) and load test characteristics (percent change of resistivity after load test) of each of the sixty resistors were measured. The load test was carried out by applying an electric power of 625 mW/mm$^2$ to the glaze resistor for 5 seconds at room temperature, and the load characteristics were calculated from the difference between the resistivities of the glaze resistor before and after the load test divided by the resistivity before the load test.

The results of all these measurements are shown in Table 1. It will be apparent from Table 1 that various resistivities in a range from 20$\Omega$/sq with small temperature coefficients of resistivity, low current noises and good load test characteristics can be obtained. As the amount of magnesium silicide increases, the resistivity becomes higher, and the temperature coefficient of resistivity increases. However, most of the values of the temperature coefficients of resistivity are less than 200 ppm/°C., except for the case of very low resistivities. The load test characteristics are good, particularly in a lower resistivity range.

However, a disadvantage of the results of this Example 1 is that a high resistivity higher than 40 or 50 or 100 k$\Omega$/sq is difficult to obtain without deteriorating other characteristics.

EXAMPLE 2

Fifty-six different glaze resistor compositions according to the invention (Sample Nos. 61 to 116) were prepared having the compositions shown in Table 2. Each composition was made as follows:

Mixtures of silicides containing aluminium, in the form of a powder, having an average particle size of 0.2 micron, and glass frit the same as the glass frit used in Example 1 were made up in the percentages shown in Table 2. Each mixture of silicides containing aluminium and a glass frit was well dispersed in an appropriate amount of liquid vehicle to make a paste suitable for screen printing. Each paste was applied on a ceramic substrate by screen printing and dried, followed by heating in air at a temperature of 850° C. for 10 minutes to obtain fifty-six different glaze resistors each in the form of a film.

The sheet resistivity, temperature coefficient of resistivity, current noise and load test characteristics of each of fifty-six resistors were measured in the same manner as in Example 1. The results of measurments are shown in Table 2.

Figure 2:
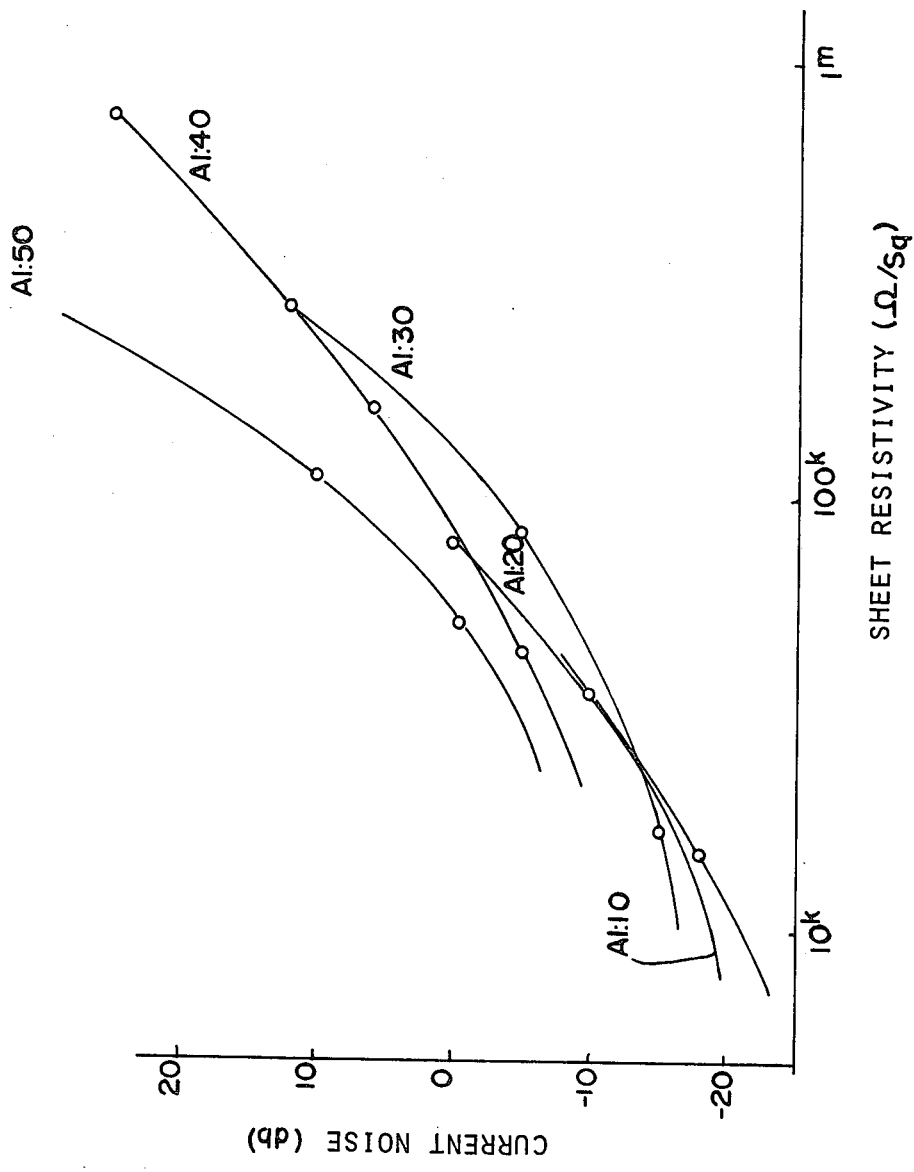
FIG. 2 is a graph showing the relation between the resistivities and current noises of two types of glaze resistors.

These measured results are also plotted in FIGS. 1 to 3.

It will be apparent from Table 2 and FIGS. 1 to 3 that various resistivities in a wide resistivity range, particularly up to a very high resistivity as compared with those in Example 1, with small temperature coefficients of resistivity, low current noise and good load test characteristics can be obtained according to the invention.

TABLE 1

| No. | Mg$_2$Si mol % | MoSi$_2$ mol % | TaSi$_2$ mol % | Al mol % | G/ C + G weight % | R $\Omega$/sq | TCR ppm/C.° | Noise db | Load Test $\Delta$R/R (%) |
|---|---|---|---|---|---|---|---|---|---|
| 1 | 10 | 81 | 9 | — | 93 | 3.0$^k$ | +50 | −15 | 0.1 |
| 2 |    |    |   |    | 90 | 700 | +80 | −23 | 0 |
| 3 |    |    |   |    | 80 | 120 | +160 | −25 | 0 |
| 4 |    |    |   |    | 50 | 15 | +300 | −26 | 0 |
| 5 | 10 | 72 | 18 | — | 93 | 3.2$^k$ | +45 | −14 | 0.15 |
| 6 |    |    |   |    | 90 | 950 | +60 | −22 | 0 |
| 7 |    |    |   |    | 80 | 160 | +130 | −26 | 0 |
| 8 |    |    |   |    | 50 | 17 | +280 | −20 | 0 |

TABLE 1-continued

| No. | Mg$_2$Si mol % | MoSi$_2$ mol % | TaSi$_2$ mol % | Al mol % | G/ C + G weight % | R Ω/sq | TCR ppm/C.° | Noise db | Load Test ΔR/R (%) |
|---|---|---|---|---|---|---|---|---|---|
| 9  | 10 | 63 | 27 | — | 93 | 6.5$^k$ | +25  | −10 | 0.15 |
| 10 |    |    |    |    | 90 | 2.0$^k$ | +35  | −14 | 0 |
| 11 |    |    |    |    | 80 | 250     | +100 | −22 | 0 |
| 12 |    |    |    |    | 50 | 23      | +200 | −24 | 0 |
| 13 | 20 | 72 | 8  | — | 93 | 3.8$^k$ | +45  | −15 | 0.12 |
| 14 |    |    |    |    | 90 | 1.2$^k$ | +60  | −20 | 0 |
| 15 |    |    |    |    | 80 | 200     | +95  | −25 | 0 |
| 16 |    |    |    |    | 50 | 18      | +165 | −25 | 0 |
| 17 | 20 | 64 | 16 | — | 93 | 4.1$^k$ | +20  | −14 | 0.10 |
| 18 |    |    |    |    | 90 | 1.7$^k$ | +35  | −18 | 0 |
| 19 |    |    |    |    | 80 | 220     | +80  | −26 | 0 |
| 20 |    |    |    |    | 50 | 20      | +150 | −27 | 0 |
| 21 | 20 | 56 | 24 | — | 93 | 16.0$^k$ | −10 | −6  | 0.21 |
| 22 |    |    |    |    | 90 | 5.1$^k$ | 0    | −15 | 0.08 |
| 23 |    |    |    |    | 80 | 480     | +15  | −25 | 0 |
| 24 |    |    |    |    | 50 | 34      | +50  | −26 | 0 |
| 25 | 40 | 50 | 10 | — | 93 | 13$^k$  | −20  | −1  | 0.5 |
| 26 |    |    |    |    | 90 | 4.2$^k$ | −5   | −10 | 0.2 |
| 27 |    |    |    |    | 80 | 520     | +10  | −25 | 0 |
| 28 |    |    |    |    | 50 | 41      | +72  | −25 | 0 |
| 29 | 40 | 45 | 15 | — | 93 | 18.5$^k$ | +45 | +5  | 0.7 |
| 30 |    |    |    |    | 90 | 7.0$^k$ | −30  | −8  | 0.2 |
| 31 |    |    |    |    | 80 | 820     | −2   | −25 | 0 |
| 32 |    |    |    |    | 50 | 79      | +83  | −26 | 0 |
| 33 | 40 | 35 | 20 | — | 93 | 22$^k$  | −78  | +10 | 0.9 |
| 34 |    |    |    |    | 90 | 10$^k$  | −40  | −17 | 0.4 |
| 35 |    |    |    |    | 80 | 970     | −8   | −22 | 0 |
| 36 |    |    |    |    | 50 | 102     | +99  | −20 | 0 |
| 37 | 55 | 40 | 5  | — | 93 | 28$^k$  | −60  | +5  | 0.42 |
| 38 |    |    |    |    | 90 | 8.2$^k$ | −14  | −10 | 0.20 |
| 39 |    |    |    |    | 80 | 580     | +6   | −25 | 0 |
| 40 |    |    |    |    | 50 | 39      | +90  | −25 | 0 |
| 41 | 55 | 35 | 10 | — | 93 | 32$^k$  | −80  | +8  | 0.82 |
| 42 |    |    |    |    | 90 | 10$^k$  | −20  | −12 | 0.18 |
| 43 |    |    |    |    | 80 | 708     | +2   | −21 | 0 |
| 44 |    |    |    |    | 50 | 45      | +85  | −20 | 0 |
| 45 | 55 | 30 | 15 | — | 93 | 42$^k$  | −100 | +15 | 1.20 |
| 46 |    |    |    |    | 90 | 13$^k$  | −32  | −10 | 0.43 |
| 47 |    |    |    |    | 80 | 1.02$^k$ | −13 | −18 | 0 |
| 48 |    |    |    |    | 50 | 86      | −72  | −23 | 0 |
| 49 | 70 | 27 | 3  | — | 93 | 41$^k$  | −50  | +10 | 2.1 |
| 50 |    |    |    |    | 90 | 15$^k$  | 015  | −6  | 0.80 |
| 51 |    |    |    |    | 80 | 900     | −10  | −11 | 0 |
| 52 |    |    |    |    | 50 | 42      | +60  | −25 | 0 |
| 53 | 70 | 24 | 6  | — | 93 | 51$^k$  | −75  | +13 | 3.0 |
| 54 |    |    |    |    | 90 | 17$^k$  | −20  | −2  | 0.32 |
| 55 |    |    |    |    | 80 | 930     | −15  | −7  | 0 |
| 56 |    |    |    |    | 50 | 51      | +55  | −25 | 0 |
| 57 | 70 | 21 | 9  | — | 93 | 71$^k$  | −120 | +19 | 5.5 |
| 58 |    |    |    |    | 90 | 20$^k$  | −30  | +2  | 0.50 |
| 59 |    |    |    |    | 80 | 1.0$^k$ | −20  | −7  | 0 |
| 60 |    |    |    |    | 50 | 55      | +43  | −26 | 0 |

TABLE 2

| No. | Mg$_2$Si mol % | MoSi$_2$ mol % | TaSi$_2$ mol % | Al mol % | G/ C + G weight % | R Ω/sq | TCR ppm/C.° | Noise db | Load Test ΔR/R (%) |
|---|---|---|---|---|---|---|---|---|---|
| 61 | 40 | 40 | 10 | 10 | 95 | 42$^k$  | −150 | −8  | 0.07 |
| 62 |    |    |    |    | 90 | 18$^k$  | −80  | −15 | 0 |
| 63 |    |    |    |    | 80 | 2.2$^k$ | +5   | −25 | 0 |
| 64 |    |    |    |    | 50 | 430     | +17  | −25 | 0 |
| 65 | 30 | 48 | 12 | 10 | 95 | 35$^k$  | −100 | −10 | 0.07 |
| 66 |    |    |    |    | 90 | 15$^k$  | −25  | −18 | 0 |
| 67 |    |    |    |    | 80 | 1.8$^k$ | +10  | −25 | 0 |
| 68 |    |    |    |    | 50 | 370     | +25  | −25 | 0 |
| 69 | 20 | 56 | 14 | 10 | 95 | 30$^k$  | −50  | −12 | 0.03 |
| 70 |    |    |    |    | 90 | 12$^k$  | −5   | −20 | 0 |
| 71 |    |    |    |    | 80 | 1.2$^k$ | +23  | −25 | 0 |
| 72 |    |    |    |    | 50 | 400     | +31  | −25 | 0 |
| 73 | 40 | 32 | 8  | 20 | 95 | 78$^k$  | −290 | 0   | 0.09 |
| 74 |    |    |    |    | 90 | 35$^k$  | −100 | −10 | 0 |
| 75 |    |    |    |    | 80 | 2.7$^k$ | −10  | −20 | 0 |
| 76 |    |    |    |    | 50 | 170     | +2   | −25 | 0 |
| 77 | 30 | 40 | 10 | 20 | 95 | 63$^k$  | −236 | −2  | 0.05 |
| 78 |    |    |    |    | 90 | 31$^k$  | −78  | −13 | 0 |
| 79 |    |    |    |    | 80 | 2.2$^k$ | −2   | −20 | 0 |

TABLE 2-continued

| No. | Mg$_2$Si mol % | MoSi$_2$ mol % | TaSi$_2$ mol % | Al mol % | G/C + G weight % | R Ω/sq | TCR ppm/C.° | Noise db | Load Test ΔR/R (%) |
|---|---|---|---|---|---|---|---|---|---|
| 80 | | | | | 50 | 152 | +13 | −25 | 0 |
| 81 | 20 | 48 | 12 | 20 | 95 | 55$^k$ | −184 | −5 | 0.06 |
| 82 | | | | | 90 | 26$^k$ | −47 | −15 | 0 |
| 83 | | | | | 80 | 1.9$^k$ | +3 | −23 | 0 |
| 84 | | | | | 50 | 130 | +22 | −25 | 0 |
| 85 | 40 | 24 | 6 | 30 | 95 | 350$^k$ | −470 | +15 | 0.47 |
| 86 | | | | | 90 | 108$^k$ | −190 | −2 | 0.15 |
| 87 | | | | | 80 | 23$^k$ | −20 | −12 | 0 |
| 88 | | | | | 50 | 850 | +4 | −20 | 0 |
| 89 | 30 | 32 | 8 | 30 | 95 | 302$^k$ | −400 | +13 | 0.40 |
| 90 | | | | | 90 | 98$^k$ | −160 | −3 | 0.12 |
| 91 | | | | | 80 | 20$^k$ | −0.5 | −13 | 0 |
| 92 | | | | | 50 | 720 | +3 | −20 | 0 |
| 93 | 20 | 40 | 10 | 30 | 95 | 270$^k$ | −380 | +20 | 0.40 |
| 94 | | | | | 90 | 83$^k$ | −157 | −5 | 0.10 |
| 95 | | | | | 80 | 17$^k$ | −18 | −15 | 0 |
| 96 | | | | | 50 | 560 | +12 | −23 | 0 |
| 97 | 40 | 16 | 4 | 40 | 95 | 1.1$^M$ | −700 | +25< | 3.50 |
| 98 | | | | | 90 | 210$^k$ | −300 | +10 | 0.50 |
| 99 | | | | | 80 | 53$^k$ | −150 | +7 | 0.10 |
| 100 | | | | | 50 | 2.4$^k$ | −3 | −20 | 0 |
| 101 | 30 | 24 | 6 | 40 | 95 | 740$^k$ | −630 | +25 | 2.70 |
| 102 | | | | | 90 | 160$^k$ | −252 | +6 | 0.30 |
| 103 | | | | | 80 | 42$^k$ | −70 | −5 | 0.05 |
| 104 | | | | | 50 | 1.6$^k$ | +7 | −23 | 0 |
| 105 | 20 | 32 | 8 | 40 | 95 | 630$^k$ | −605 | +25 | 1.80 |
| 106 | | | | | 90 | 97$^k$ | −156 | +2 | 0.35 |
| 107 | | | | | 80 | 23$^k$ | −17 | −10 | 0.05 |
| 108 | | | | | 50 | 1.1$^k$ | +13 | −25 | 0 |
| 109 | 30 | 16 | 4 | 50 | 95 | 3.4$^M$ | −1000 | +25< | 15.6 |
| 110 | | | | | 90 | 450$^k$ | −500 | +25< | 4.5 |
| 111 | | | | | 80 | 180$^k$ | −160 | +13 | 0.75 |
| 112 | | | | | 50 | 58$^k$ | −60 | 0 | 0.1 |
| 113 | 20 | 20 | 10 | 50 | 95 | 1.8$^M$ | −850 | +25< | 12 |
| 114 | | | | | 90 | 260$^k$ | −320 | +25< | 1.25 |
| 115 | | | | | 80 | 110$^k$ | −160 | +10 | 0.3 |
| 116 | | | | | 50 | 51$^k$ | −60 | −0.5 | 0.05 |

What is claimed is:

1. A glaze resistor composition which consists essentially of 95 to 50% by weight of a glass frit and 5 to 50% by weight of a mixture of silicides comprising molybdenum disilicide, tantalum disilicide, magnesium silicide and aluminium, the molar ratio of molybdenum disilicide plus tantalum disilicide plus magnesium silicide to aluminium being from 90:10 to 60:40.

2. A glaze resistor composition according to claim 1, in which the molar ratio of molybdenum disilicide plus tantalum disilicide to magnesium silicide is from 60:40 to 80:20.

3. A glaze resistor composition according to claim 1, in which the molar ratio of molybdenum disilicide to tantalum disilicide is from 90:10 to 70:30.

4. A glaze resistor composition according to any of claims 1 to 3, in which the mixture of silicides and aluminium contains 1 to 40 molar % of aluminium.

5. A glaze resistor composition according to any of claims 1 to 3, in which the glass frit is a barium borate glass which may contain niobium oxide.

6. A glaze resistor composition according to claim 5, wherein the amount of niobium oxide in the glass frit is from 0 to 3% in weight.